Sept. 27, 1966 L. A. STURTEVANT 3,274,827
FORCE-TRANSMITTING MEASURING MECHANISM
Filed Oct. 4, 1963 2 Sheets-Sheet 2
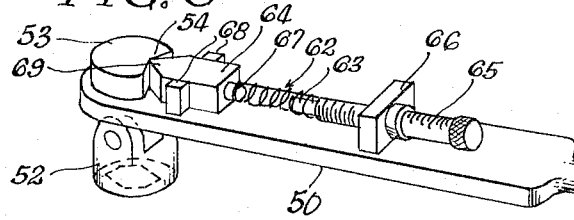
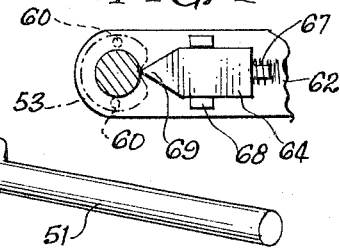
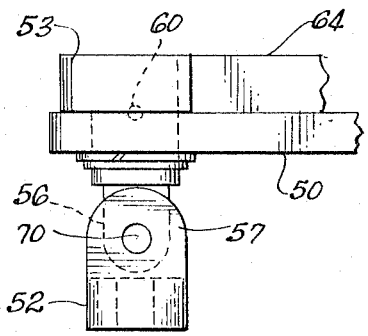
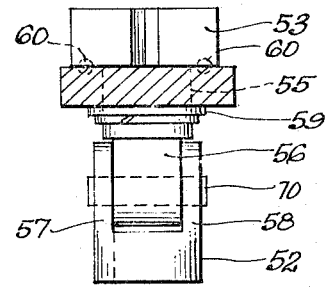
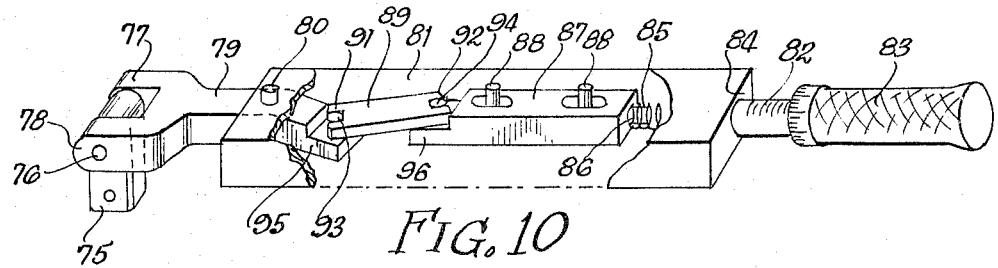
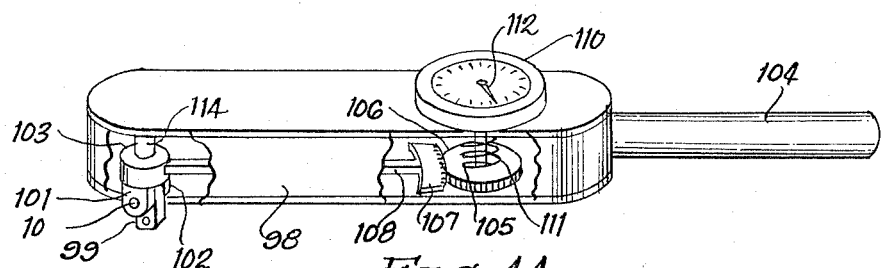
INVENTOR.
Lee A. Sturtevant
BY
Atty

United States Patent Office 3,274,827
Patented Sept. 27, 1966

3,274,827
FORCE-TRANSMITTING MEASURING
MECHANISM
Lee A. Sturtevant, Elmhurst, Ill.
(120 E. Lake St., Addison, Ill.)
Filed Oct. 4, 1963, Ser. No. 313,849
7 Claims. (Cl. 73—139)

This invention relates to a force-transmiting mechanism commonly known as a torque wrench and, more particularly, to the types employing a round flexible beam or a rigid frame.

The round flexible beam type of torque wrench is simple and sturdy. It consists of a wrench head, a handle and a round rod or beam extending from the head to the handle. The rod or beam constitutes the measuring element as well as the frame. The torque reading is accomplished by using a pointer preferably fixed to the head and extending approximately to the handle where a reading of the beam's deflection is obtained by the use of a calibrated scale usually attached to a rigid metal plate. As the wrench is used and torque is developed at the wrench head, the long frame or beam flexes to change the relationship between the pointer and the scale. This change in relationship is read at the scale and represents the torque being applied. In this design, there are no frail mechanisms because the beam or measuring element is sufficiently long to give easily readable movement. The absence of frictionally movable parts and sensitive mechanisms makes this type of torque wrench extremely accurate.

An undesirable feature in a round beam type of measuring element as heretofore constructed is that this round measuring element will deflect equally in any direction from its neutral axis. In other words, the round measuring element will deflect in any plane and, if a force is applied in an upward direction of the handle, the round beam will bend and cause a pointer drag and an inaccurate reading at the scale. If the operator should attempt to apply torque to the work by an angular pull on the handle other than at right angles to the axis of rotation of the work, a degree of inaccuracy would follow due to said pointer drag and improper deflection of the round measuring beam.

The rigid frame type of torque wrench usually employs torque-transmitting parts between the wrench head and the frame having a predetermined torque-transmitting connection that will produce an inaccurate torque reading or indication if and when a force is applied in a plane other than at right angles to the axis of rotation of the work-engaging member. This is usually due to an increased or abnormal frictional drag between the parts that render the torque reading indication inaccurate.

An object of the invention is to provide a round beam type of torque wrench with means which eliminate imposing radial loads at the work or work-engaging member except such loads as are imposed on the handle in planes at right angles to said work or work-engaging member.

A further object of the invention is to accomplish the aforesaid results by employing a floating control drive which will effectively alert and compel an operator to pull the handle at right angles to the axis of rotation of the work. Consequently, any laxity by the operator or failure to pull correctly in the proper angular direction on the handle of the wrench will cause a so-called floating action which is readily sensed by the operator and which will immediately alert the operator that he is using the wrench incorrectly.

A still further object of the invention is to provide a floating control drive for a round beam type of torque wrench which permits the operator to raise the handle end to clear an obstruction while still pulling the torque wrench to tighten the work.

A still further object of the invention is to provide the aforesaid means also in the rigid frame type of wrench that will eliminate an increased or abnormal frictional drag in the torque-transmitting parts that causes inaccurate torque readings or indications when a force is likewise applied in a plane other than at right angles to the axis of rotation of the work-engaging member.

The invention provides a construction admitting of greater adaptability of extensions or adapters in the form of drive squares, or the like, to gain access to otherwise inaccessible applications and thereby increase the effective range of the torque wrench.

Further objects and advantages of the invention will be apparent from the following detail description when taken in connection with the accompanying drawings, in which:

FIG. 6 is a perspective view of one form of torque wrench of the rigid frame type employing the present invention;

FIG. 7 is a detail view, partly in cross section, illustrating one form of connection between the work-engaging member and the rigid frame;

FIG. 8 is an enlarged side elevational detail of the end of the wrench having the work-engaging member;

FIG. 9 is an end view of the structure shown in FIG. 8;

FIG. 10 is a perspective view of another form of torque wrench of the rigid frame type; and FIG. 11 is a perspective view of a still further form of torque wrench of the rigid frame type.

Figure 1:
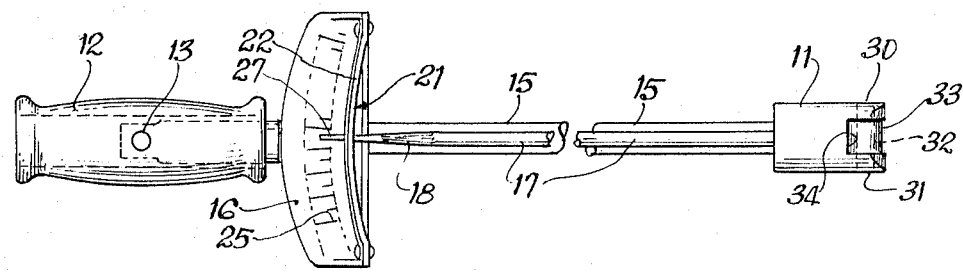
FIGURE 1 is a top elevational view of a torque measuring wrench embodying the invention.

The wrench illustrated in FIGS. 1 to 5, inclusive, includes a work-engaging member 10, a head member 11 and a handle 12 pivotally connected at 13 to a force-applying member 14. A round or tubular flexible torque measuring beam 15 is preferably fixedly connected at one end to head 11 and is likewise preferably fixedly connected at the other end to force-applying member 14. As will be later explained, a force applied to handle 12 and to force-applying member 14 in a tightening direction of the work will be transmitted through the tubular flexible torque measuring beam 15 to head 11 and work-engaging member 10. As the resistance of the work causes the tubular beam 15 to flex, the handle 12 and force-applying member 14 will rotate relative to head 11 and work-engaging member 10. The force applied to the handle 12 will continue to move the handle 12 together with the force-applying member 14 in an arc with head member 11 and work-engaging member 10 as a pivot as the work is tightened. This rotary or pivotal movement between handle 12 and work-engaging member 10 is measured at a scale 16 mounted upon force applying member 14 by a pointer 17 secured in fixed relation at one end to head member 11.

Pointer 17 may taper and be offset upwardly at 18 to provide clear spaces 19 and 20 above and below this pointer in an arcuate slot 21 formed in an upturned flange-like portion 22 comprising a part of a plate 23. If so desired, plate 23 may be mounted directly upon force-applying member 14 and be arranged to carry scale 16 thereon. The scale reading 25 may be calibrated in foot or inch pounds, or according to any desired terms. The free end 27 may be formed in a flat knife-like edge 28 that rides above and along calibration 25 but out of contact with scale plate 16 to avoid any frictional drag of this pointer end 27. By keeping the pointer also out of contact with the upper and lower edges of arcuate slot 21, all frictional drag between pointer 17 and the scale structure 16 will be avoided.

Head 11 is bifurcated at its outer end to provide lateral or side lugs or stops 30 and 31. The upper end of work-engaging member 10 is embraced within the bifurcated structure and carried by a pivot pin 32 fixedly anchored in lugs 30 and 31. In the present embodiment of the invention, work-engaging member 10 is preferably square in cross section except at its top end 33 where it may be formed round if so desired although this is not necessary. Detents 35 protrude slightly from the vertical faces of work-engaging member 10 to snap into small upper and lower openings 36 and 37 that extend through lugs 30 and 31, whereby to hold the work-engaging member 10 in either vertical position extending upwardly or downwardly, the action being such that the operator will know when either vertical position is obtained.

Figure 3:
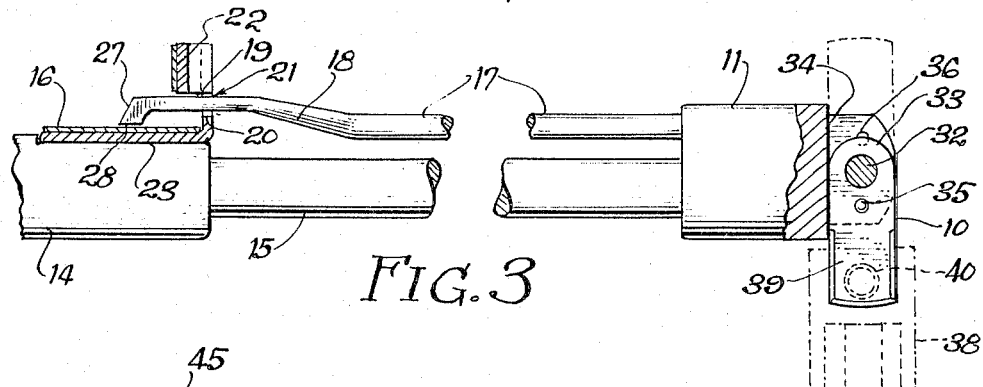
FIG. 3 is an enlarged side view with parts in elevation and broken-away parts in section.

The usual standard male drive square 38 is shown in dotted lines in FIG. 3 and to this square 38 are attached ordinary sockets, socket extensions or adapters (not shown) or it is used directly to engage the work to tighten the same. Whatever the arrangement may be, the projecting end 39 is provided with a detent 40 to lock into corresponding holes in this square 33.

Figure 2:
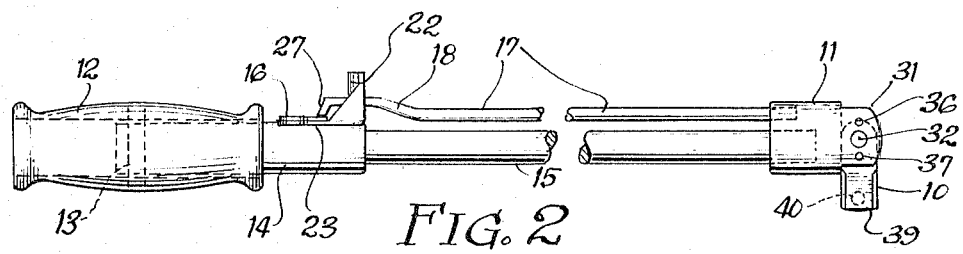
FIG. 2 is a side elevational view of the same.

As will be apparent, the structure shown in FIGS. 1 to 3, inclusive, will limit the turning movement of work-engaging member 10 about its axis and the axis of square 38 engaging the work directly or through well-known adapters (not shown). Any tendency of the operator to tilt the torque measuring beam 15 upwardly will merely cause pivoting of head 11 about pin 32 without any resultant turning of work-engaging member 10, the pointer 17 maintaining its spaced relation or position with respect to the torque measuring beam 15 and the pointer tip 27 remaining out of dragging contact with the upper or lower walls of arcuate slot 21 in member 22 or with the scale 16.

However, any movement of torque measuring beam 15 in a direction at right angles to the axis of work-engaging member 10 will cause lugs or stops 30 and 31 to engage and turn the work-engaging member 10 about its axis and as the work is tightened, the extent of the deflection of the torque measuring beam 15 and the torque applied will be read by the position of pointer end 27 above scale 16. In this case, deflection of the torque measuring beam 15 will not alter or disturb the spaced relation of pointer 17 so that pointer tip 27 will not engage or drag against either upper or lower wall of arcuate slot 21 in member 22 or the face 27 drag against and over the face of scale 16.

Figure 4:
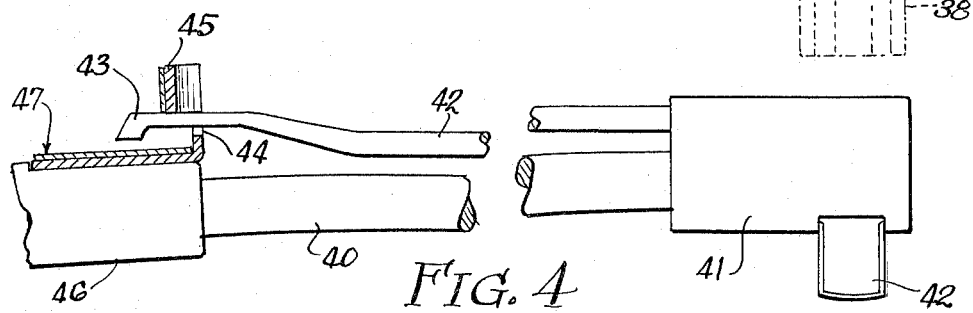
FIG. 4 is a similar view, but of a structure not embodying the present invention, showing how a downward deflection of a round beam in a plane not at right angles to the axis of rotation of the work-engaging member will cause the drag of the pointer and a consequent inaccurate reading at the scale.
Figure 5:
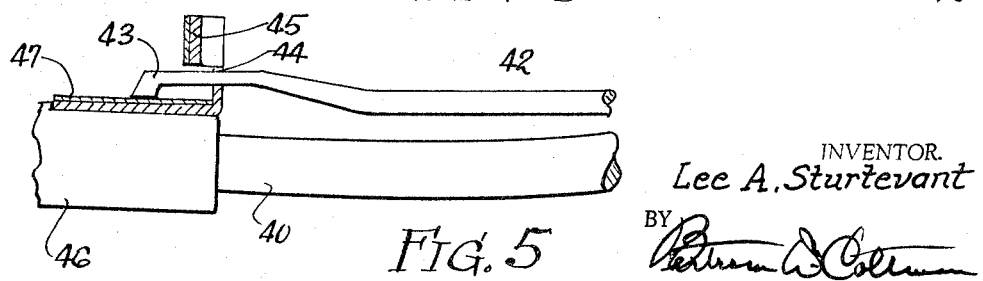
FIG. 5 is a similar view of the same structure shown in FIG. 4 showing the drag of the pointer and consequent inaccurate reading at the scale when the round beam is deflected upwardly likewise in a plane not at right angles to the axis of rotation of the work-engaging member, the forward portion shown in FIG. 4 being omitted.

FIGS. 4 and 5 illustrate the conditions occurring in a round beam type of torque wrench when the present invention is not employed. As shown, the torque measuring beam 40 may be deflected either downwardly or upwardly, as the case may be, about head member 41 as a fulcrum point because work-engaging member 42 fixed in head member 41 will have no pivotal relation therewith. Such deflecting action of the torque measuring beam 40, whether upwardly or downwardly, will upset the spaced relation of pointer 42 and cause this pointer 42 to cause a dragging friction through contact of its free end 43, either with the upper or lower edges of arcuate slot 44 in plate member 45 mounted upon force-applying member 46 and carrying scale 47. In either case, the accuracy of the reading is obviously affected and will not always be noted by the operator if this upward or downward pull is made a part of the total movement of the measuring beam 40, that is to say, if such upward or downward pull is combined in part with a pull at right angles to the axis of work-engaging member 42. Any effort of the operator, for example, to avoid an obstacle in the free path of the wrench or to use the wrench in inaccessible locations will result in this deflection because the round beam will deflect in any direction. Such deflection will cause inaccurate readings at the scale and inaccurate applications of torque to the work without the knowledge of the operator in many cases.

FIGS. 6–11, inclusive, show several forms of torque wrenches of the rigid frame type embodying the present invention.

In FIGS. 6–9, inclusive, the torque wrench comprises a frame member 50 having a handle 51 at one end and a connection with a work-engaging member 52. Work-engaging member 52 includes a head 53 provided with a V-groove 54 and a reduced shank 55 terminating in a downwardly projecting lug 56 adapted to lie between upstanding side lugs or stops 57 and 58 carried by work-engaging member 52. Head 53 is held against the upper face of frame 50 in any suitable manner, say, by one or more rings 59 driven tightly upon lug 56 against the underface of frame member 50 but in a manner permitting rotational or pivotal movement in a plane at right angles to the axis of the work-engaging member. Any number of ball bearings or similar detent members 60 may be lodged between head 53 and the outer end of frame member 50 to normally decrease resistance of the relative rotation between frame 50 and head 53 but to prevent such relative movement upon an application of a predetermined torque to the work at handle 51 through connection 62. This connection 62 comprises generally a coil spring 63 mounted between sliding block 64 and an adjusting member 65 carried by a block 66 fixed upon frame 50. Adjusting member 65 is threaded and is adapted to lie within one end of coil spring 63. The other end of coil spring 63 rests over a knob 67 carried by sliding block 64. Sliding block 64 is adapted to move but is held between upstanding studs 68 on frame 50. The tension of spring 63 may be varied by adjusting member 65 so that the maximum torque that can be applied to the work through connection 62 may be predetermined. When the torque load is being applied at the work, the tension of spring 63 is sufficient to transmit the force applied at handle 51 in a plane at right angles to the axis of rotation of the work. When a predetermined torque is reached, however, the tension of spring 63 will be overcome and a pointed tip 69 will be forced out of groove 54 to free the connection and allow relative rotation between head 53 and frame 50.

Work-engaging member 52 may be operated in either direction in order to tighten the work. Pointed tip 69 will slip out of groove 54 in either direction along the faces of the groove depending upon the necessary direction of rotation to tighten the work.

Any tendency of the operator to attempt to transmit force to the work-engaging member 52 other than in a plane at right angles to the axis of the work-engaging member will cause pivotal movement of lug 56 about a pivotal pin 70 carried by lugs 57 and 58 of the work-engaging member 52. Failing to move frame 50 and handle 51 in the plane at right angles to the axis of the work-engaging member will therefore not permit any increased resistance between head 53 and frame 50. To be effective, the application of force at handle 51 must therefore be in a plane at right angles to the axis of the work-engaging member in order to tighten or loosen the work, and any portion of the so-called applied force not in this plane will merely cause rotation of lug 56 about pivot pin 70 and therefore prevent the deflection of frame member 50 and any increased resistance between head 53 and frame 50.

Another form of torque wrench of the rigid frame type will be noted in FIG. 10. In this instance, the work-engaging member 75 is carried on pivot pin 76 by lugs 77 and 78 projecting from head 79. Head 79 is pivotally carried at 80 at the forward end of frame 81 which may be in any form, such as the housing shown in this FIG. 10. An adjusting screw 82 carried by handle 83 threadedly passes through the end 84 of housing 81. A coil spring 85 is held between the free end of threaded screw 82 and a stud 86 carried at the end of a slidable block 87 within frame member 81. This slidable member may be guided by pins 88 fixed to housing member 81. A double pivotal member 89 has opposite ends bifurcated at 91 and 92 so as to fork pins 93 and 94 carried respectively at the opposing ends of reduced end 95 of head 79 and reduced end 96 of slidable member 87. During and when the work is tightened, the force applied at handle 83 will move the wrench in a plane at right angles to the axis of rotation of the work-engaging member 75. Any variation of movement of the torque wrench from this said plane will cause the head member 79 to swing upwardly or downwardly about its pivot pin 76 without permitting housing 81 from being distorted and further without permitting any of the force being applied to be transmitted as torque to work-engaging member 75 and eliminates any increased resistance between pivot 80 and housing member 81. The application of a predetermined torque is, in this case, also determined by the tension of coil spring 85 adjustable by adjusting screw 82. When the tension of spring 85 is overcome, flexible connection 89 will move to the position illustrated in FIG. 10 so as to prevent further transmission of the applied force at the handle 83 to head 79 and to limit the torque that is applied at the work-engaging member 75.

Another form of torque wrench of the rigid frame type is shown in FIG. 11. In this instance, housing 98 has work-engaging member 99 suitably disposed in pivotally mounted relation on pin 100 carried by lugs 101 and 102 on head member 103. The force applied at handle 104 is transmitted through housing 98 and torsional pin 114 anchored to the top of housing 98. A toothed segment 107 is carried by a bar 108 attached to head 103 so that the force applied at handle 104 and transmitted through housing 98 and torsional pin 114 will be transmitted in reverse through an extension 108 from head 103 and through toothed segment 107, gear 106 and pin 111 so as to be indicated at dial 110, a spring 105 functioning, of course, to prevent any backlash between segment 107 and gear 106. If, however, the operator fails to maintain handle 104 and housing 98 in a plane at right angles to the axis of rotation of the work-engaging member 99, head 103 will, through lugs 101 and 102, tilt or float about pin 100 with respect to work-engaging member 99. The arrangement of the parts prevents therefore any applied force at handle 104, other than in the plane at right angles to the axis of rotation of work-engaging member 109, from being transmitted to the work and then a resultant deflection of torsional pin 114 will be prevented, and thereby to prevent an inaccurate reading at dial 110 through needle pin 111 operating needle 112.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A force-transmitting mechanism comprising a force-applying member, a work-engaging member, a head member carrying said work-engaging member, a round torque measuring beam interposed between said force-applying member and said head, a pivotal mounting for said work-engaging member, said pivotal mounting being carried by said head, the pivotal mounting preventing distortion of said measuring beam by forces or force components received by said force-applying member in any plane other than at right angles to the axis of said work-engaging member said pivotal mounting including a pivotal axis transversely disposed to said torque measuring beam and at right angles to the axis of said work-engaging member.

2. A force-transmitting mechanism comprising a force-applying member, a work-engaging member, a head member carrying said work-engaging member, a substantially round torque measuring beam interposed between said force-applying member and said head, a pivotal mounting for said work-engaging member, said pivotal mounting being carried by said head, the pivotal mounting preventing distortion of said measuring beam by forces or force components received by said force-applying member in any plane other than at right angles to the axis of said work-engaging member, said pivotal mounting including a pivotal axis transversely disposed to said torque measuring beam and at right angles to the axis of said work-engaging member, a calibrated scale carried by said force-applying member, and a pointer fixed at one end to said head, the free end of said pointer cooperating with said calibrated scale for indicating the deflection of said beam.

3. A force-transmitting mechanism comprising a force-applying member, a work-engaging member, a head member carrying said work-engaging member, a substantially round torque measuring beam interposed between said force-applying member and said head to transmit the force applied by said force-applying member to said work-engaging member, means for indicating the force so applied including a calibrated scale at the end of said measuring beam adjacent to said force-applying member, a pointer having one end fixed to said head and having the other end cooperating with said calibrated scale, and means maintaining said pointer at a constant distance from said measuring beam upon deflection thereof, said means including a pivotal connection between said work-engaging member and said head member the pivotal axis of which is transversely disposed to said torque measuring beam and at right angles to the axis of said work-engaging member.

4. A force-transmitting mechanism comprising a force-applying member, a work-engaging member, a head member carrying said work-engaging member, a round torque measuring beam interposed between said force-applying member and said head to transmit the force applied by said force-applying member to said work-engaging member, means for indicating the force so applied including a calibrated scale at the end of said measuring beam adjacent to said force-applying member, a pointer having one end fixed to said head and having the other end cooperating with said calibrated scale, and means maintaining said pointer at a constant distance from said measuring beam upon deflection thereof, said means comprising a pivotal mounting between said head member and said work-engaging member including a pivotal axis transversely disposed to said torque measuring beam and at right angles to the axis of said work-engaging member to prevent deflection of said measuring beam when moving in a plane other than at right angles to the axis of rotation of said work-engaging member.

5. A force-transmitting mechanism comprising a force-applying member, a head member, a torque measuring beam interposed in fixed relation between said force-applying member and said head, a work-engaging member and a mounting on said head for said work-engaging member, said mounting preventing distortion of said measuring beam by forces or force components received by said force-applying member in any plane other than at right angles to the axis of said work-engaging member, said mounting including a pivotal connection between said work-engaging member and said head member, the pivotal axis of which is transversely disposed to said torque measuring beam and at right angles to the axis of said work-engaging member.

6. A force-transmitting mechanism comprising a force-applying member, a work-engaging member, a head member carrying said work-engaging member, torque measuring means interposed between said force-applying member and said head, a pivotal mounting for said work-engaging member, said pivotal mounting being carried by said head, the pivotal mounting preventing distortion and inaccurate functioning of said measuring means by forces or force components received by said force-applying member in any plane other than at right angles to the axis of said work-engaging member said pivotal mounting including a pivotal axis transversely disposed to said torque measuring means and at right angles to the axis of said work-engaging member.

7. A force-transmitting mechanism as defined in claim 6 wherein said torque measuring means is of the rigid frame type and employs torque-transmitting parts having a predetermined torque release connection.

References Cited by the Examiner

Torque Manual (second edition), P. A. Sturtevant Co., copyright 1957, pages 6 and 7 relied on.

RICHARD C. QUEISSER, *Primary Examiner.*

C. A. RUEHL, *Assistant Examiner.*